(12) United States Patent
Arai

(10) Patent No.: US 6,625,096 B1
(45) Date of Patent: Sep. 23, 2003

(54) OPTICAL DISK RECORDING AND REPRODUCTION METHOD AND APPARATUS AS WELL AS MEDIUM ON WHICH OPTICAL DISK RECORDING AND REPRODUCTION PROGRAM IS RECORDED

(75) Inventor: Toru Arai, Tokyo (JP)

(73) Assignee: NEC Corporation, Tokyo (JP)

(*) Notice: Subject to any disclaimer, the term of this patent is extended or adjusted under 35 U.S.C. 154(b) by 614 days.

(21) Appl. No.: 09/605,395

(22) Filed: Jun. 29, 2000

(30) Foreign Application Priority Data

Jul. 2, 1999 (JP) .......................... 11-188713

(51) Int. Cl.[7] ............................... G11B 7/00
(52) U.S. Cl. ................. 369/47.34; 369/47.33; 369/53.35
(58) Field of Search .................. 369/44.11, 44.26, 369/47.31, 47.32, 47.33, 47.34, 53.35, 275.3, 47.14, 53.15, 53.31, 53.34, 53.36, 124.14, 124.15

(56) References Cited

U.S. PATENT DOCUMENTS

| | | | | |
|---|---|---|---|---|
| 4,813,011 A | * | 3/1989 | Kulakowski et al. | 369/44.26 |
| 5,218,590 A | * | 6/1993 | Miyasaka | 369/47.13 |
| 5,303,219 A | * | 4/1994 | Kulakowski et al. | 369/53.17 |
| 5,319,626 A | * | 6/1994 | Ozaki et al. | 369/53.17 |
| 5,699,330 A | * | 12/1997 | Ogino et al. | 369/44.27 |
| 6,169,710 B1 | * | 1/2001 | Arai | 369/30.11 |

FOREIGN PATENT DOCUMENTS

| | | |
|---|---|---|
| JP | 62-80867 | 4/1987 |
| JP | 63-195877 | 8/1988 |
| JP | 3-36971 | 3/1991 |
| JP | 4-266117 | 9/1992 |
| JP | 4-358362 | 12/1992 |
| JP | 6-139718 | 5/1994 |
| JP | 8-315519 | 11/1996 |
| JP | 10-50005 | 2/1998 |
| JP | 10-208399 | 8/1998 |
| JP | 11-86454 | 3/1999 |

OTHER PUBLICATIONS

Japanese Office action dated Apr. 4, 2003, with English translation of pertinent portions.

* cited by examiner

*Primary Examiner*—Thang V. Tran
*Assistant Examiner*—Bach Vuong
(74) *Attorney, Agent, or Firm*—Whitham, Curtis & Christofferson, PC

(57) ABSTRACT

The invention provides an optical disk recording and reproduction method which suppresses a drop of the throughput of an optical disk apparatus by retrying caused by a read error. A control section of an optical disk apparatus controls, if a read error occurs upon reading out of data from a first address of an optical disk by an optical head section, the optical head section to perform retrying of reading out from the first address. Each time retrying is performed, the control section records the number of times of retrying into a memory. Then, if reading out from the first address is performed successfully, then the control section reads out the number of times of retrying from the memory. If the number of times of retrying exceeds a prescribed number of times then the control section secures an alternative second address in place of the first address on the optical disk. Then, when none of recording or writing processing for the optical disk is performed by the optical disk apparatus, the control section copies data read out from the first address to the second address and rewrites the DMA of the optical disk so that, when a read command for the first address is thereafter received from a host apparatus, data may be read out from the second address.

9 Claims, 2 Drawing Sheets

OPTICAL DISK RECORDING AND REPRODUCTION METHOD AND APPARATUS AS WELL AS MEDIUM ON WHICH OPTICAL DISK RECORDING AND REPRODUCTION PROGRAM IS RECORDED

BACKGROUND OF THE INVENTION

1. Field of the Invention

The present invention relates to an optical disk recording and reproduction method and apparatus by which defect processing is performed and a medium on which an optical disk recording and reproduction program is recorded.

2. Description of the Related Art

Optical disk recording and reproduction apparatus which have a defect function upon data writing are conventionally available.

An optical disk recording and reproduction apparatus of the type mentioned secures, if a write error of data occurs when an address X of an optical disk is accessed to write data, an alternative address Y in place of the address X and records data, which are to be recorded to the address X, to the address Y.

When the address X is to be accessed upon reading, the address Y is accessed in place of the address X to read out necessary data.

Consequently, use of a bad spot of the optical disk is eliminated thereby to raise the reliability of the optical disk.

An optical disk has a recording area which includes a user area used for recording and reproduction of normal data, a spare area secured for defect processing, and a DMA (Defect Management Area) into which correspondence between addresses of the user area and addresses of the spare area is recorded.

In the defect processing mentioned above, an address Y of the spare area is secured for the address X of the user area, and the information that the address X has been replaced by the address Y is recorded into the DMA.

However, even such data that is successfully written upon data writing sometimes becomes an error when it is read out.

In this instance, the optical disk recording and reproduction apparatus performs retrying of reading out of data so that necessary data can be read out thereby to secure the reliability upon data reading.

In particular, if a read error occurs upon data reading from an address X of an optical disk by an optical head section of an optical disk recording and reproduction apparatus, then the optical disk recording and reproduction apparatus takes the following method. In particular, the optical head section performs retrying of reading out from the address X, and the number of times of retrying is recorded into a memory each time such retrying is performed. Then, if reading out from the address X is performed successfully, then the number of times of retrying recorded in the memory is read out and compared with a prescribed number of times. If the number of times of retrying exceeds the prescribed number of times, then an alternative address Y for the address X is secured on the optical disk, and the data read out from the address X is copied to the address Y. Then, the DMA of the optical disk is rewritten so that, when a reading command for the address X is received from a host apparatus after then, data is read out from the address Y.

However, the processing of securing the alternative address Y in place of the address X on an optical disk, copying data read out from the address X to the address Y and rewriting the DMA of the optical disk so that, when a reading command for the address X is received from a host apparatus after then, data may be read out from the address Y provides a disadvantage that no sufficient time may possibly be secured to read data into the optical disk recording and reproduction apparatus and temporal specifications of an I/F (interface) may not be satisfied.

Meanwhile, as a prior art apparatus, an apparatus is disclosed in Japanese Patent Laid-Open No. 195877/1988 wherein data recorded on a recording medium is read out and, when an error of the data is higher than a predetermined reference value, the data is stored into a different memory and then next data is successively recorded onto the recording medium, and then, after the recording of a string of data onto the recording medium comes to an end, the data stored in the different memory is re-recorded onto the recording medium.

Another apparatus is disclosed in Japanese Patent Laid-Open No. 139718/1994 wherein, when an unrecoverable error occurs upon reading of a particular sector of a recording medium and a number of retrying reading operations smaller than a number of times set in advance are performed, the number of data errors upon each of the first reading operation and retrying reading operations following the first reading operation is counted and stored into a data error number storage memory.

A further apparatus is disclosed in Japanese Patent Laid-Open No. 50005/1998 wherein, when reading retrying is performed successfully with such an after-defect that requires retrying operations upon reading of a rewritable optical disk, the read data is used to perform replacement processing within the sequence to perform data compensation.

The apparatus disclosed in the documents mentioned above cannot successfully solve such a subject that no sufficient time may possibly be secured to read data into the optical disk recording and reproduction apparatus and temporal specifications of an I/F may not be satisfied as described above.

SUMMARY OF THE INVENTION

It is an object of the present invention to provide an optical disk recording and reproduction method and apparatus which suppresses a drop of the throughput of an optical disk apparatus by retrying caused by a read error and can satisfy temporal specifications of an interface.

In order to attain the object described above, according to an aspect of the present invention, there is provided an optical disk recording and reproduction method for an optical disk recording and reproduction apparatus which includes an optical head section for recording and reading out data onto and from an optical disk, a tracking section for positioning the optical head section on a track of the optical disk, a control section for controlling operation of the optical head section and the tracking section in response to a command from a host apparatus, and a memory for temporarily recording data necessary for the control by the control section, comprising the steps of causing, if a read error occurs upon reading out of data from a first address of the optical disk by the optical head section, the optical head section to perform retrying of the reading out of the first address of the optical disk and recording a number of times of retrying into the memory each time such retrying is performed, reading out, if the reading out from the first address is performed successfully, the number of times of retrying recorded in the memory, comparing the read out number of times of retrying with a prescribed number of times and, if the number of times of retrying exceeds the prescribed number of times, securing an alternate second address in place of the first address on the optical disk, and copying, when the optical disk recording and reproduction apparatus is performing none of reading processing and writing processing for the optical disk, the data read out from the first address to the second address and rewriting a defect management area of the optical disk so that, when a read command for the first address is received from the host apparatus thereafter, the data may be read out from the second address.

In the optical disk recording and reproduction method, if a read error occurs upon reading out of data from a first address of the optical disk by the optical head section, then the control section controls the optical head section to perform retrying of the reading out of the first address of the optical disk and records a number of times of retrying into the memory each time such retrying is performed. Then, if the reading out from the first address is performed successfully, then the control section reads out the number of times of retrying recorded in the memory and compares the read out number of times of retrying with the prescribed number of times. If the number of times of retrying exceeds the prescribed number of times, then the control section secures an alternate second address in place of the first address on the optical disk, and performs, when the optical disk recording and reproduction apparatus is performing none of reading processing and writing processing for the optical disk, the processing of copying of the data read out from the first address, to the second address and rewriting of the defect management area of the optical disk so that, when a read command for the first address is received from the host apparatus thereafter, the data may be read out from the second address. Consequently, a drop of the throughput of an optical disk apparatus by retrying caused by a read error can be suppressed and temporal specifications of an interface can be satisfied.

Thus, with the optical disk recording and reproduction method, within a free time within which none of reading processing and writing processing is being performed by the optical disk recording and reproduction apparatus, the series of processing of securing an alternate second address for a first address on an optical disk, copying data read out from the first address to the second address and rewriting the defect management area of the optical disk so that, when a read command for the first address is received, data may be read out from the second address is performed. Further, defect processing is not performed upon writing of data but performed for data which is successfully readout from the optical disk by retrying upon reading out from the optical disk. Consequently, repetition of retrying of reading out when the same address is accessed frequently can be suppressed, and as a result, the optical disk recording and reproduction method can be carried out while temporal specifications of an interface are satisfied.

According to another aspect of the present invention, there is provided an optical disk recording and reproduction apparatus, comprising an optical head section for recording and reading out data onto and from an optical disk, a tracking section for positioning the optical head section on a track of the optical disk, a control section for controlling operation of the optical head section and the tracking section in response to a command from a host apparatus, and a memory for temporarily recording data necessary for the control by the control section, the control section controlling the optical head section, the optical head section and the memory such that, if a read error occurs upon reading out of data from a first address of the optical disk by the optical head section, the optical head section performs retrying of the reading out of the first address of the optical disk and a number of times of retrying is recorded into the memory each time such retrying is performed, and if the reading out from the first address is performed successfully, then the number of times of retrying recorded in the memory is read out and compared with a prescribed number of times, and then, if the number of times of retrying exceeds the prescribed number of times, then an alternate second address in place of the first address is secured on the optical disk, whereafter, when the optical disk recording and reproduction apparatus is performing none of reading processing and writing processing for the optical disk, the data read out from the first address is copied to the second address and a defect management area of the optical disk is rewritten so that, when a read command for the first address is received from the host apparatus thereafter, the data may be read out from the second address.

In the optical disk recording and reproduction apparatus, if a read error occurs upon reading out of data from a first address of the optical disk by the optical head section, then the control section controls the optical head section to perform retrying of the reading out of the first address of the optical disk and records a number of times of retrying into the memory each time such retrying is performed. Then, if the reading out from the first address is performed successfully, then the control section reads out the number of times of retrying recorded in the memory and compares the read out number of times of retrying with the prescribed number of times. If the number of times of retrying exceeds the prescribed number of times, then the control section secures an alternate second address in place of the first address on the optical disk, and performs, when the optical disk recording and reproduction apparatus is performing none of reading processing and writing processing for the optical disk, the processing of copying of the data read out from the first address to the second address and rewriting of the defect management area of the optical disk so that, when a read command for the first address is received from the host apparatus thereafter, the data may be read out from the second address. Consequently, a drop of the throughput of an optical disk apparatus by retrying caused by a read error can be suppressed and temporal specifications of an interface can be satisfied.

Thus, with the optical disk recording and reproduction apparatus, within a free time within which none of reading processing and writing processing is being performed by the optical disk recording and reproduction apparatus, the series of processing of securing an alternate second address for a first address on an optical disk, copying data read out from the first address to the second address and rewriting the defect management area of the optical disk so that, when a read command for the first address is received, data may be read out from the second address is performed. Further, defect processing is not performed upon writing of data but performed for data which is successfully read out from the optical disk by retrying upon reading out from the optical disk. Consequently, repetition of retrying of reading out when the same address is accessed frequently can be suppressed, and as a result, the optical disk recording and reproduction method can be carried out while temporal specifications of an interface are satisfied.

According to a further aspect of the present invention, there is provided a medium on which an optical disk recording and reproduction program is recorded, the optical disk recording and reproduction program causing an optical disk recording and reproduction apparatus to execute the steps of causing, if a read error occurs upon reading out of data from a first address of an optical disk by an optical head section of the optical disk recording and reproduction apparatus, the optical head section to perform retrying of the reading out of the first address of the optical disk and recording a number of times of retrying each time such retrying is performed, reading out, if the reading out from the first address is performed successfully, the recorded number of times of retrying, comparing the read out number of times of retrying with a prescribed number of times and, if the number of times of retrying exceeds the prescribed number of times, securing an alternate second address in place of the first address on the optical disk, and copying, when the optical disk recording and reproduction apparatus is performing none of reading processing and writing processing for the optical disk, the data read out from the first address to the second address and rewriting a defect management area of the optical disk so that, when a read command for the first address is received from a host apparatus thereafter, the data may be read out from the second address.

On the medium, the optical disk recording and reproduction program is recorded which causes an optical disk recording and reproduction apparatus to execute the steps of causing, if a read error occurs upon reading out of data from a first address of an optical disk by an optical head section of the optical disk recording and reproduction apparatus, the optical head section to perform retrying of the reading out of the first address of the optical disk and recording a number of times of retrying each time such retrying is performed, reading out, if the reading out from the first address is performed successfully, the recorded number of times of retrying, comparing the read out number of times of retrying with a prescribed number of times and, if the number of times of retrying exceeds the prescribed number of times, securing an alternate second address in place of the first address on the optical disk, and copying, when the optical disk recording and reproduction apparatus is performing none of reading processing and writing processing for the optical disk, the data read out from the first address to the second address and rewriting a defect management area of the optical disk so that, when a read command for the first address is received from a host apparatus thereafter, the data may be read out from the second address. Therefore, if the medium is applied to an optical disk recording and reproduction apparatus, then the optical disk recording and reproduction apparatus operates in accordance with the optical disk recording and reproduction program. Consequently, a drop of the throughput of the optical disk recording and reproduction apparatus by retrying caused by a read error can be suppressed and temporal specifications of an interface can be satisfied.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENT

Figure 1:
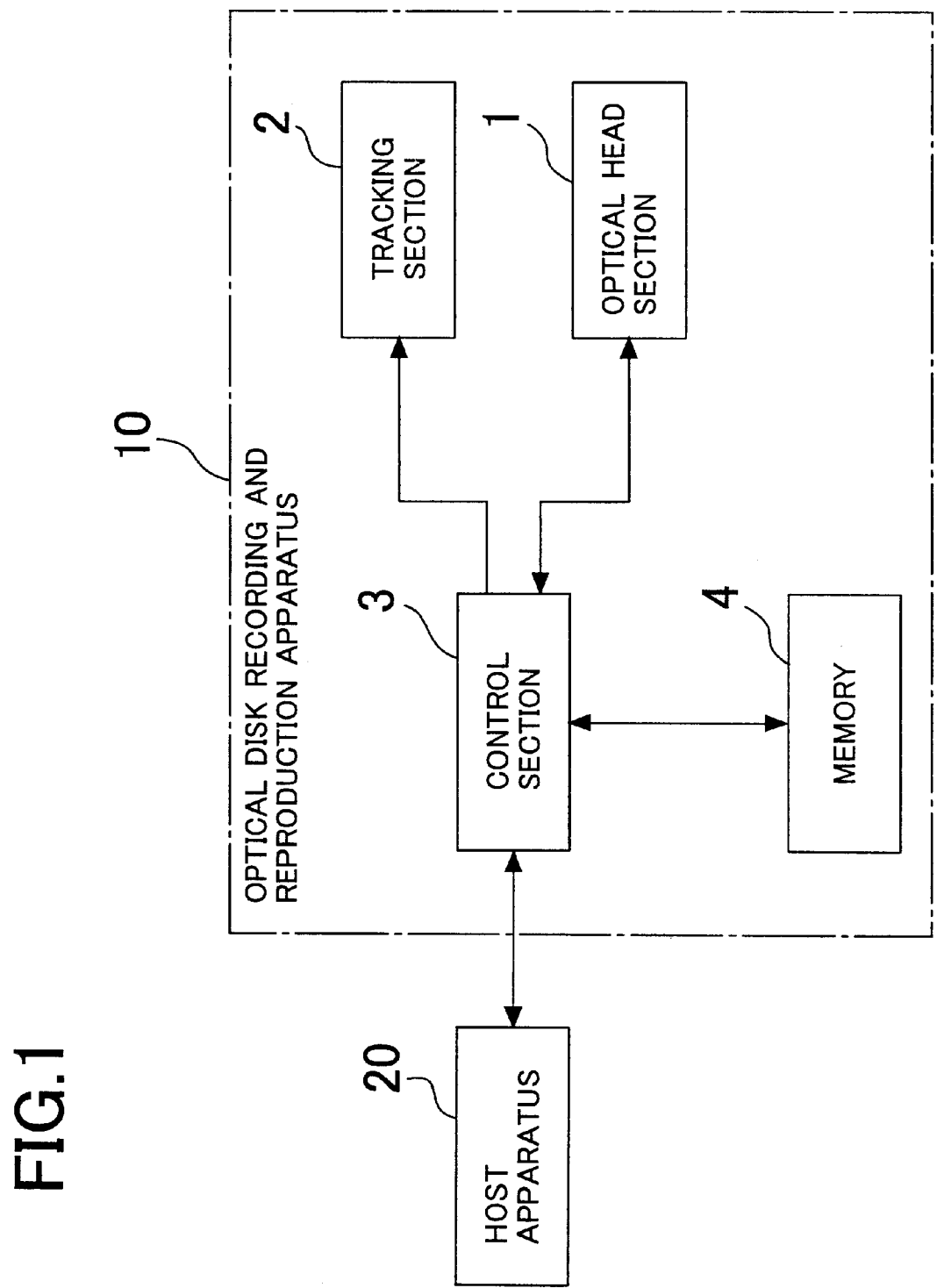
FIG. 1 is a block diagram showing a construction of an optical disk recording and reproduction apparatus to which the present invention is applied.

Referring first to FIG. 1, there is shown a construction of an optical disk recording and reproduction apparatus to which the present invention is applied. The optical disk recording and reproduction apparatus shown is generally denoted at 10 and includes an optical head section 1 for recording and reading out data onto and from an optical disk not shown, a tracking section 2 for positioning an optical head (not shown) of the optical head section 1 on a predetermined track of the optical disk, a control section 3 for controlling operation of the optical head section 1 and the tracking section 2 in accordance with a command from a host apparatus 20, and a memory 4 for temporarily recording data to be used for control by the control section 3, that is, a medium on which an optical disk recording and reproduction program is recorded.

The control section 3 controls, if a read error occurs upon reading out of data from an address X of the optical disk by the optical head section 1, the optical head section 1 to perform retrying of reading out from the address x. Each time retrying is performed, the control section 3 records the number of times of retrying into the memory 4. Then, if reading out from the address X is performed successfully, then the control section 3 reads out the number of times of retrying recorded in the memory 4 and compares it with a prescribed number of times. If the number of times of retrying exceeds the prescribed number of times, then the control section 3 secures an alternative address Y in place of the address X on the optical disk, copies the data read out from the address X to the address Y, and rewrites the DMA of the optical disk so that, when a read command for the address X is thereafter received from the host apparatus 20, data may be read out from the address Y.

This processing is realized by an optical disk recording and reproduction program executed by a computer included in the control section 3.

The optical disk recording and reproduction program may alternatively be red out from a computer-readable medium and executed by the optical disk recording and reproduction apparatus 10.

Now, operation of the optical disk recording and reproduction apparatus 10 is described with reference to a flow chart of FIG. 2. The description of the operation is description also of an optical disk recording and reproduction method according to the present invention.

Figure 2:
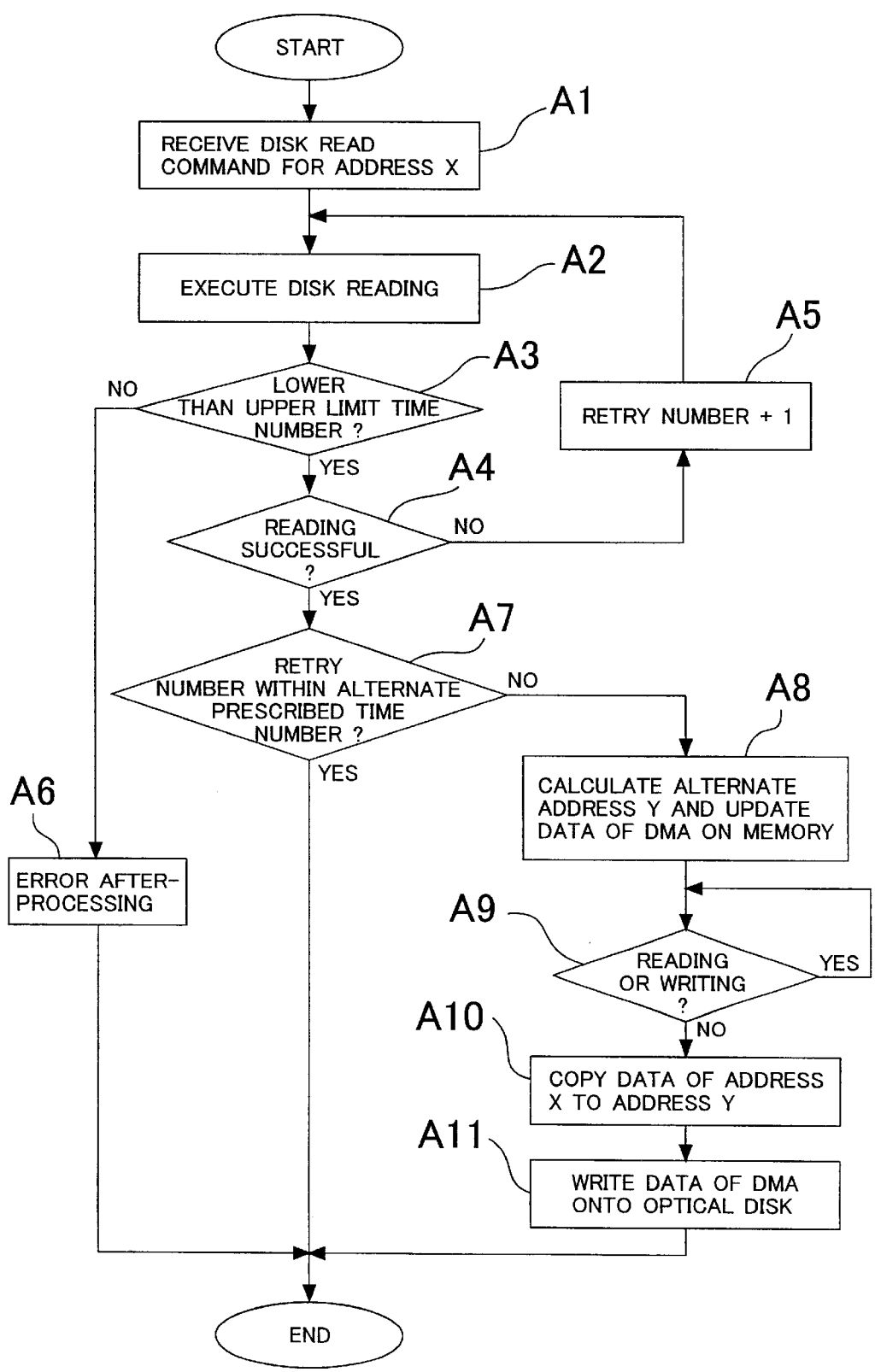
FIG. 2 is a flow chart illustrating processing of a control section of the optical disk recording and reproduction apparatus of FIG. 1.

The flow chart of FIG. 2 illustrates processing executed by the computer included in the control section 3. The control section 3 first receives a read command (disk read command) for the address X of the optical disk from the host apparatus 20 (step A1).

In response to the read command, the control section 3 controls the tracking section 2 to position the optical head at a predetermined position and controls the optical head system 1 to read out data from the address X. In other words, the control section 3 executes disk reading processing (step A2).

Here, if a read error occurs (No in step A4 as hereinafter described), then the control section 3 controls the tracking section 2 and the optical head section 1 to perform retrying of reading from the same address X. In particular, in the flow chart of FIG. 2, the processing of the control section 3 advances from step A4 to step A5 and back to step A2. Each time such retrying is performed, a retrying time number is incremented by "+1" (step A5).

In short, the "retry number+1" is executed in step A5. Thus, each time such retrying is performed, the control section 3 increments the retrying time number by "+1" and records the updated retrying time number into the memory 4.

Then, the control section 3 discriminates whether or not the retrying time number is equal to an upper limit time number set in advance (step A3). If the discrimination proves that the retrying time number is equal to the upper limit time number set in advance, then the control section 3 gives up reading out from the same address X and executes conventionally popular error after-processing (step A6).

While retrying is repeated because the data at the address X cannot be read out as described above, the number of times of retrying is successively counted in step A5. Then, if reading out of the data from the address X is performed successfully by such retrying (step A4), then the control section 3 reads out the number of times of retrying, which has been counted till then, from the memory 4 and compares the retrying time number with a prescribed time number (alternate prescribed time number) set in advance (step A7).

If the number of times of retrying is within the alternate prescribed time number, then the control section 3 ends its processing immediately.

On the other hand, if the retrying time number exceeds the alternate prescribed time number, then the control section 3 makes preparations for execution of defect processing.

In particular, the control section 3 calculates an alternate address Y corresponding to the address X and updates data of the DMA which has been copied to the memory 4 from the optical disk in advance.

Here, if reading processing or writing processing is proceeding, then the control section 3 waits the reading or writing processing is completed (step A9). After accessing of the optical disk recording and reproduction apparatus 10 to the optical disc comes to an end, the control section 3 writes the information that the alternate address Y has been allocated to the address X on the data of the DMA of the memory 4 (step S8).

Then, the control section 3 copies the data read out from the address X to the address Y (step A10) and then writes the updated data of the DMA of the memory 4 back into the DMA of the optical disk (step A11).

Thereafter, when a read command for the address X is received from the host apparatus 20, the control section 3 reads out the data from the alternate address Y.

Consequently, the processing the optical disk recording and reproduction apparatus 10 can be dispersed, and since the processing of writing on the data of the DMA on the memory 4 of the information that the alternate address Y has been allocated to the address X, copying the data read out from the address X to the address Y and writing the data of the DMA updated on the memory 4 back into the DMA of the optical disk is not executed in reading processing of the optical disk recording and reproduction apparatus, additional time to the reading processing is eliminated. As a result, such a situation that temporal specifications of an interface are not satisfied can be eliminated.

It is to be noted that, in the description of the embodiment above, the address X may be an address in the user area while the address Y may be an address in the spare area of the optical disk.

While a preferred embodiment of the present invention has been described using specific terms, such description is for illustrative purposes only, and it is to be understood that changes and variations may be made without departing from the spirit or scope of the following claims.

What is claimed is:

1. An optical disk recording and reproduction method for an optical disk recording and reproduction apparatus which includes an optical head section for recording and reading out data onto and from an optical disk, a tracking section for positioning said optical head section on a track of the optical disk, a control section for controlling operation of said optical head section and said tracking section in response to a command from a host apparatus, and a memory for temporarily recording data necessary for the control by said control section, comprising the steps of:

causing, if a read error occurs upon reading out of data from a first address of the optical disk by said optical head section, said optical head section to perform retrying of the reading out of the first address of:the optical disk and recording a number of times of retrying into said memory each time such retrying is performed;

reading out, if the reading out from the first address is performed successfully, the number of times of retrying recorded in said memory, comparing the read out number of times of retrying with a prescribed number of times and, if the number of times of retrying exceeds the prescribed number of times, securing an alternate second address in place of the first address on the optical disk; and copying, when said optical disk recording and reproduction apparatus is performing none of reading processing and writing processing for the optical disk, the data read out from the first address to the second address and rewriting a defect management area of the optical disk so that, when a read command for the first address is received from said host apparatus thereafter, the data may be read out from the second address.

2. An optical disk recording and reproduction apparatus as claimed in claim 1, wherein said control section updates data of the defect management area which has been copied from the optical disk in advance into said memory when the alternate second address is secured on the optical disk.

3. An optical disk recording and reproduction method as claimed in claim 1, wherein the first address is an address of a user area of the optical disk.

4. An optical disk recording and reproduction method as claimed in claim 1, wherein the second address is an address of a spare area of the optical disk.

5. An optical disk recording and reproduction apparatus, comprising:

an optical head section for recording and reading out data onto and from an optical disk;

a tracking section for positioning said optical head section on a track of the optical disk;

a control section for controlling operation of said optical head section and said tracking section in response to a command from a host apparatus; and a memory for temporarily recording data necessary for the control by said control section;

said control section controlling said optical head section, said optical head section and said memory such that, if a read error occurs upon reading out of data from a first address of the optical disk by said optical head section, said optical head section performs retrying of the reading out of the first address of the optical disk and a number of times of retrying is recorded into said memory each time such retrying is performed, and if the reading out from the first address is performed successfully, then the number of times of retrying recorded in said memory is read out and compared with a prescribed number of times, and then, if the number of times of retrying exceeds the prescribed number of times, then an alternate second address in place of the first address is secured on the optical disk, whereafter, when said optical disk recording and reproduction apparatus is performing none of reading processing and writing processing for the optical disk, the data read out from the first address is copied to the second address and a defect management area of the optical disk is rewritten so that, when a read command for the first address is received from said host apparatus thereafter, the data may be read out from the second address.

6. An optical disk recording and reproduction apparatus as claimed in claim 5, wherein the first address is an address of a user area of the optical disk.

7. An optical disk recording and reproduction apparatus as claimed in claim 5, wherein the second address is an address of a spare area of the optical disk.

8. A medium on which an optical disk recording and reproduction program is recorded, the optical disk recording and reproduction program causing an optical disk recording and reproduction apparatus to execute the steps of:

causing, if a read error occurs upon reading out of data from a first address of an optical disk by an optical head section of said optical disk recording and reproduction apparatus, said optical head section to perform retrying of the reading out of the first address of the optical disk and recording a number of times of retrying each time such retrying is performed;

reading out, if the reading out from the first address is performed successfully, the recorded number of times of retrying, comparing the read out number of times of retrying with a prescribed number of times and, if the number of times of retrying exceeds the prescribed number of times, securing an alternate second address in place of the first address on the optical disk; and copying, when said optical disk recording and reproduction apparatus is performing none of reading processing and writing processing for the optical disk, the data read out from the first address to the second address and rewriting a defect management area of the optical disk so that, when a read command for the first address is received from a host apparatus thereafter, the data may be read out from the second address.

9. A medium as claimed in claim 8, wherein the program is read out from a computer-readable medium and executed by said optical disk recording and reproduction apparatus.

* * * * *